(12) United States Patent
Seymour et al.

(10) Patent No.: US 8,504,271 B2
(45) Date of Patent: Aug. 6, 2013

(54) SYSTEM AND METHOD FOR ASSISTING THE BRAKING SYSTEM OF A VEHICLE

(75) Inventors: Shafer Seymour, Bartlett, IL (US); David Pivonka, Winfield, IL (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 201 days.

(21) Appl. No.: 13/030,228

(22) Filed: Feb. 18, 2011

(65) Prior Publication Data

US 2012/0215411 A1  Aug. 23, 2012

(51) Int. Cl.
*G06F 7/70* (2006.01)
*G06F 19/00* (2011.01)
*G06G 7/00* (2006.01)
*G06G 7/76* (2006.01)

(52) U.S. Cl.
USPC ............................................. 701/70; 701/423

(58) Field of Classification Search
USPC ................ 701/117, 31.4, 31.9, 33.9, 38, 416,
701/423, 51, 517, 53, 532, 57, 58, 65, 70,
701/93; 702/182, 19, 34; 477/107, 125,
477/80; 340/426.33, 435, 438, 453, 467,
340/539.26, 870.07, 903, 936; 303/122,
303/122.15, 155, 191, 7
See application file for complete search history.

(56) References Cited

U.S. PATENT DOCUMENTS

| 6,819,995 | B2 * | 11/2004 | Bellinger | 701/53 |
| 7,711,462 | B2 * | 5/2010 | Daniels et al. | 701/31.4 |
| 2008/0236269 | A1 * | 10/2008 | Howell et al. | 73/121 |

FOREIGN PATENT DOCUMENTS

| DE | 102004009417 A1 | 9/2005 |
| WO | 2006/042628 A1 | 4/2006 |
| WO | 2009/010199 A1 | 1/2009 |

OTHER PUBLICATIONS

International Search Report dated May 4, 2012, from corresponding International Patent Application No. PCT/US2012/023132.

* cited by examiner

*Primary Examiner* — Thomas Black
*Assistant Examiner* — Isaac Smith

(57) ABSTRACT

A system for assisting the braking system of a vehicle includes a processor, a global position system receiver in communication with the processor, and an antenna for receiving global positioning system signals. The processor may be configured to determine the braking efficiency of the vehicle, collecting global positioning system information from the global position system receiver, determine a distance to an end of a grade of a road the vehicle is traveling based on the global positioning system information, determine if there is a possibility of failure of the braking system of the vehicle based on the braking efficiency of the vehicle and the distance to the end of the grade of the road the vehicle is traveling on, and execute a mitigating action to prevent braking failure.

22 Claims, 3 Drawing Sheets

SYSTEM AND METHOD FOR ASSISTING THE BRAKING SYSTEM OF A VEHICLE

BACKGROUND

1. Field of the Invention

This invention relates to systems and methods for assisting the braking system of a vehicle.

2. Description of Related Art

Vehicles have a variety of safety systems to prevent or minimize injury to a driver of the vehicle. Such systems include antilock braking systems, passive restraint systems, and active restraint systems. However, even with these systems in place, there is still a possibility that the vehicle may need additional assistance to minimize or prevent injury to the driver of the vehicle. This can be especially true, when the vehicle is traveling down an extremely steep grade of road, placing significant pressure on the braking system of the vehicle. In these situations, there is a possibility that the braking system of the vehicle may fail, putting the driver and others in risk of injury.

SUMMARY

A system and method for assisting the braking system of a vehicle includes a processor, a global position system receiver in communication with the processor, and an antenna for receiving global positioning system signals. The processor may be configured to determine the braking efficiency of the vehicle, collect global positioning system information from the global position system receiver, and determine a grade and a distance to an end of a grade of a road the vehicle is traveling. The processor is also configured to determine if there is a possibility of failure of the braking system of the vehicle based on the braking efficiency of the vehicle and the distance to the end of the grade of the road the vehicle is traveling on, and execute a mitigating action to prevent braking failure.

The mitigating action may include adjusting the powertrain settings of the powertrain of the vehicle, engine braking or applying the brakes of the vehicle. Further, the mitigating action may include informing the driver of the vehicle if there is a nearby runaway truck ramp or other stretch of road that will slow the vehicle down.

Further objects, features and advantages of this invention will become readily apparent to persons skilled in the art after a review of the following description, with reference to the drawings and claims that are appended to and form a part of this specification.

DETAILED DESCRIPTION

Figure 1:
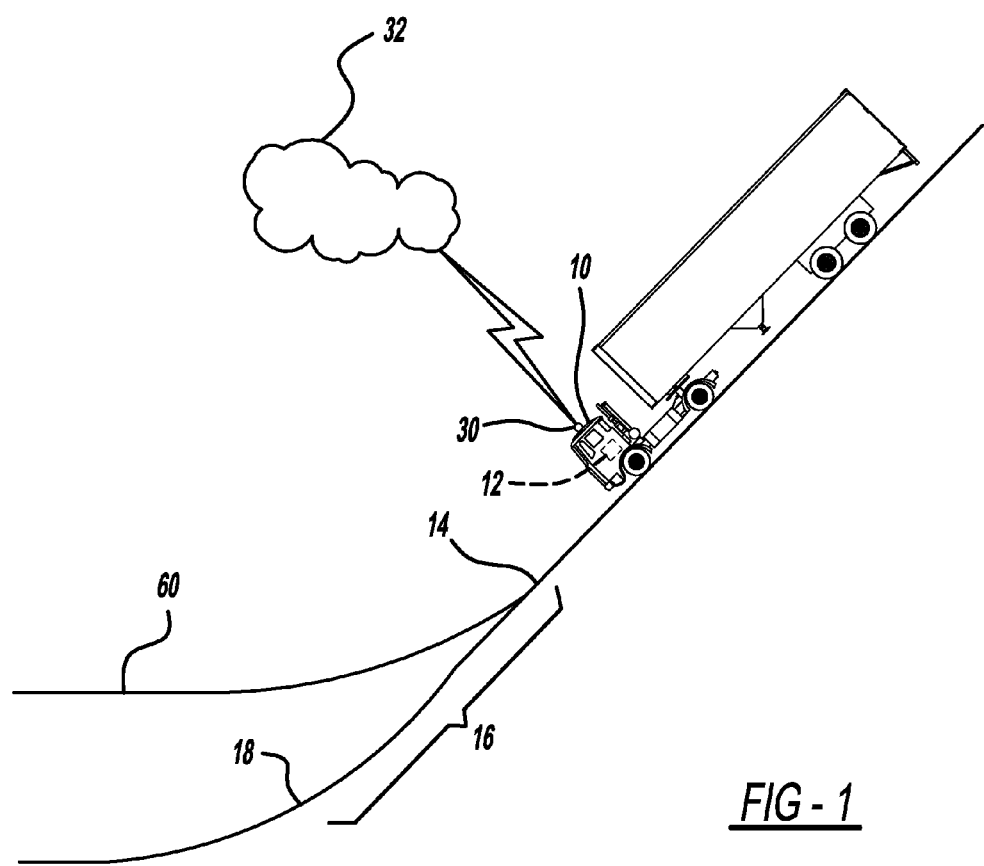
FIG. 1 illustrates a system for assisting the braking system of an vehicle.

Referring to FIG. 1, in a vehicle 10 having a system 12 for assisting the braking system of the vehicle 10 is shown. The vehicle 10 can be essentially any wheeled vehicle, such as a car, truck, sport utility vehicle, or tractor trailer. Additionally, the vehicle 10 could also include construction equipment and other types of heavy equipment. Here, the vehicle 10 is traveling down a road 14 made of multiple road segments. As will be described in the paragraphs that follow, the system 12 determines if there is a possibility of failure of the braking system of the vehicle 10 based on the braking efficiency of the vehicle 10 and a distance 16 to an end 18 of the road 14 which the vehicle 10 is traveling.

Figure 2:
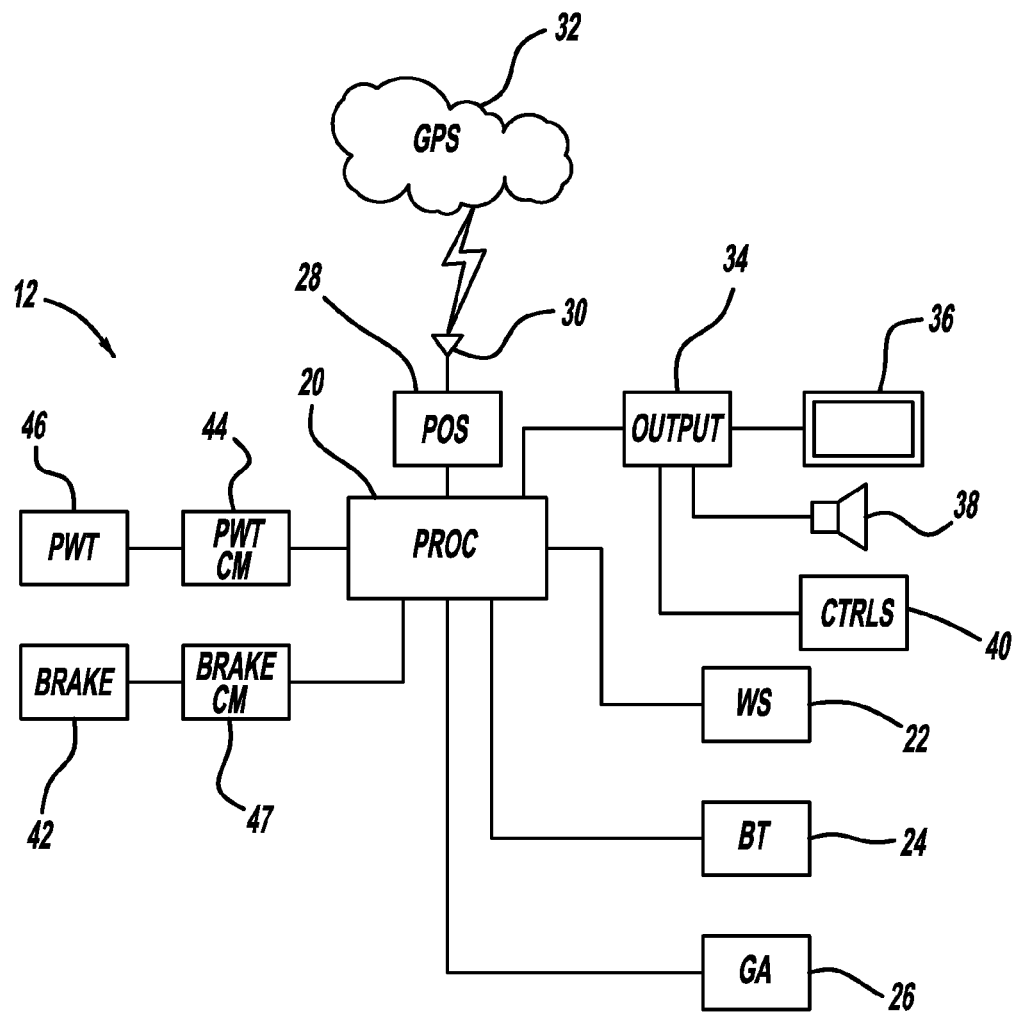
FIG. 2 is a more detailed illustration of the system for assisting the braking system of an vehicle.

Referring to FIG. 2, a more detailed illustration of the system 12 for assisting the braking system and vehicle 10 is shown. The system 12 includes a processor 20 that is in communication with a plurality of sensors. More specifically, the processor 20 may be in communication with a wheel speed sensor 22, a brake temperature sensor 24, and a grade angle 26. The wheel speed sensor 22 determines the wheel speed of at least one wheel of the vehicle 10 and reports this information to the processor 20. The brake temperature sensor 24 determines the temperature of at least one brake of the vehicle 10 and reports this information to the processor 20. Finally, the grade angle sensor 26 determines the grade angle of the vehicle 10 and reports this information to the processor 20.

The system 12 also includes a positioning system 28 having an antenna 30. The positioning system utilizes the antenna 30 to communicate with a global positioning satellite system 32. The positioning system 28 can use the information from the global positioning satellite system 32 to determine the location of the vehicle 10. Additionally, the positioning system 28 may include a map database and may be able to determine which road the vehicle 10 is traveling on or will be traveling on. The positioning system 28 can provide route guidance to a driver of the vehicle 10.

The processor 20 may be in communication with an output system 34, which may have a display 36, a speaker 38, and an input system 40. The display 36 and the speaker 38 allow the output system 34 to provide information to the driver of the vehicle 10 through both visual and audio communications. The control system 40 allows the driver of the vehicle 10 to provide information to the processor 20. This information can include destination information, so that the positioning system 28 can determine an appropriate route for the vehicle 10 to travel on. This route information may then be relayed to the driver of the vehicle 10 via the output system 34 using the display 36 and speaker 38.

The processor 20 may also be capable of interacting with the powertrain 46 and braking system 42 of the vehicle 10 via a powertrain control module 44 and brake control module 46, respectively. Moreover, the powertrain control module 44 and brake control module 47 are in communication with the processor 20 and are capable of receiving instructions from the processor 20. The processor 20 may send gear selection, throttle position and engine braking instructions to a powertrain module 44, which then adjusts the settings of the powertrain 40. The processor 20 may apply the brake 42 by sending instructions to the brake control module 46.

Figure 3:
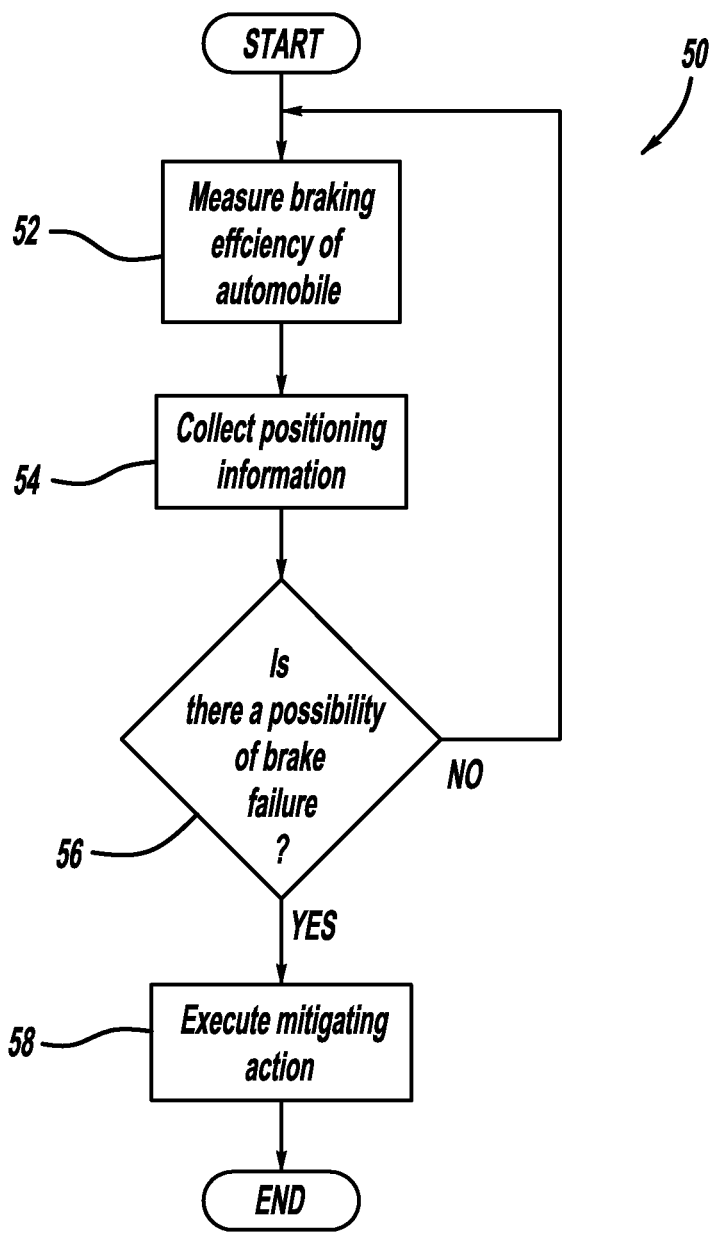
FIG. 3 illustrates a method for assisting the braking system of a vehicle.

Referring to FIG. 3, a method 50 for assisting the braking system of the vehicle 10 is shown. Reference will be made to both FIGS. 1 and 2 when describing the method 50. The method 50 may be stored in a computer readable storage medium having stored therein instructions executable by the processor 20 for assisting the braking system The method 50 begins with step 52, wherein the processor 20 measures the braking efficiency of the vehicle 10. In determining the braking efficiency of the vehicle 10, the processor 20 may use information from the wheel speed sensor 22, the brake temperature sensor 24, and the grade angle sensor 26. As stated before, these sensors relay information to the processor 20 relating to the wheel speed of at least one wheel, the brake temperature of a least one brake, and the grade angle of the vehicle 10.

In step 54, the processor 20 collects positioning information from the positioning unit 28. The positioning information may include the distance 16 to an end 18 of a grade of the road 14 which the vehicle 10 is traveling on. Thereafter, in step 56, the processor 20 determines if there is a possibility of brake failure based on the braking efficiency of the vehicle 10 and the distance 16 to an end 18 of the grade of the road 14 the vehicle 10 is traveling on. If there is no possibility of a brake failure, the method 50 returns to step 52.

However, if there is a possibility of brake failure, the processor 20 executes a mitigating action, as illustrated in step 58. The mitigating action may include adjusting the powertrain settings of the powertrain 46 of the vehicle 10 by interacting with the powertrain control module 44. This can include changing a gear of the vehicle 10 and/or the throttle position of the engine of the vehicle. The mitigating action may also include applying the brakes 42 of the vehicle 10 by having the processor 20 interact with the braking control module 47.

Additionally, the mitigating action may be activating engine braking of the powertrain 46 of the vehicle 10. Engine braking is the opening of exhaust valves in the cylinders of the engine, releasing the compressed air trapped in the cylinders, and slowing the vehicle 10. When the powertrain control module 44 adjusts the settings of the powertrain 46 and releases the accelerator on a moving vehicle 10 powered by a diesel engine, the vehicle's forward inertia continues to turn the engine's crankshaft, drawing air into the cylinders as the pistons move down and compressing that air as the pistons move back up. The pressure of the compressed air pushes back on the up-going piston, tending to slow the vehicle 10.

With a gasoline engine, the mechanics are different and a special valve is not necessary for engine braking to happen when the powertrain control module 44 adjusts the settings of the powertrain 46 and releases the accelerator. In the gasoline engine, with the accelerator released, a throttle prevents the free flow of air into the cylinders, so there is little pressure to release at the top of the compression stroke. The throttle itself provides engine braking through friction in the air flowing through it.

Further, the mitigating action may include informing the driver of the vehicle 10 if there is a runaway truck ramp 60 near the location of the vehicle 10. Generally, the positioning system 28 determines if there is a nearby runaway truck ramp 60 by determining the position of the vehicle 10. If there is a runaway truck ramp in the area, the processor 20 will inform the driver of the vehicle 10 by utilizing the output device 34. The output device 34 will then relay this information to the driver utilizing the display 36 and/or the speaker 38. Additionally, if the driver determines that utilizing the runaway truck ramp 60 is not an option; the driver can then inform the processor 20 by using the controls 40. The processor 20 can then determine if there are other alternative routes that can mitigate or prevent braking failure of the vehicle 10.

While the above description constitutes the preferred embodiment of the present invention, it will be appreciated that the invention is susceptible to modification, variation, and change without departing from the proper scope and fair meaning of the accompanying claims.

In other embodiments, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Further, the methods described herein may be embodied in a computer-readable medium. The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

As a person skilled in the art will readily appreciate, the above description is meant as an illustration of the principles of the invention. This description is not intended to limit the scope or application of the invention in that the invention is susceptible to modification, variation and change, without departing from spirit of the invention, as defined in the following claims.

The invention claimed is:

1. A method for assisting a braking system of a vehicle, the method comprising the steps of:
   determine a braking efficiency of the vehicle;
   collecting global positioning system information from a global positioning system;
   determining a distance to an end of a grade of a road the vehicle is traveling based on the global positioning system information;
   determining if there is a possibility of failure of the braking system of the vehicle based on the braking efficiency of the vehicle and the distance to the end of the grade on which road the vehicle is traveling; and
   executing a mitigating action to prevent braking failure, the mitigation action comprising:
   receiving destination information, which is input by a vehicle driver to an input device coupled to a processor;
   determining an alternative route to a destination using the global positioning system;
   providing alternative route information to the driver on an output device coupled to the processor, the alternative route information identifying to the driver, an alternative route to the destination and which can mitigate vehicle brake failure.

2. The method of claim 1, wherein the step of determining a braking efficiency of the vehicle further comprises the step of determining the brake temperature of the braking system, the brake temperature being obtained from a temperature sensor, configured to determine an actual temperature of at least one brake.

3. The method of claim 2, wherein the step of determining a braking efficiency of the vehicle further comprises the step of determining the wheel speed of the vehicle.

4. The method of claim 3, wherein the step of determining a braking efficiency of the vehicle further comprises the step of determining the grade angle of the vehicle.

5. The method of claim 1, wherein the mitigating action is downshifting a gear of the vehicle.

6. The method of claim 1, wherein the mitigating action comprises: informing the driver of the vehicle if there is a runaway truck ramp near the location of the vehicle, using audio signals from a speaker.

7. The method of claim 6, wherein the mitigating action of: receiving destination information input to an input device coupled to a processor, determining an alternative route to a destination using the global positioning system, and providing alternative route information to an output device coupled to the processor, occurs after informing the driver of the vehicle that utilizing a runaway truck ramp is not an option.

8. In a non-transistory computer readable storage medium having stored therein instructions executable by a programmed processor for assisting the braking system of a vehicle, the non-transitory storage medium comprising instructions for:
   determining the braking efficiency of the vehicle;
   collecting global positioning system information;
   determining a distance to an end of a grade of a road the vehicle is traveling based on the global positioning system information;
   determining if there is a possibility of failure of the braking system of the vehicle based on the braking efficiency of the vehicle and the distance to the end of the grade of the road on which the vehicle is traveling; and
   executing a mitigating action to prevent braking failure, the mitigation action comprising:
   receiving destination information that is input to an input device coupled to a processor;
   determining an alternative route to a destination using the global positioning system;
   providing alternative route information to an output device coupled to the processor, the alternative route information identifying an alternative route to the destination, which can mitigate vehicle brake failure.

9. The non-transitory computer readable storage medium of claim 8, wherein the step of determining a braking efficiency of the vehicle further comprises the step of determining the brake temperature of the braking system by reading a brake temperature from a temperature sensor.

10. The non-transitory computer readable storage medium of claim 9, wherein the step of determining a braking efficiency of the vehicle further comprises the step of determining the wheel speed of the vehicle.

11. The non-transitory computer readable storage medium of claim 10, wherein the step of determining a braking efficiency of the vehicle further comprises the step of determining the grade angle of the vehicle.

12. The non-transitory computer readable storage medium of claim 8, wherein the mitigating action is downshifting a gear of the vehicle.

13. The non-transitory computer readable storage medium of claim 8, wherein the mitigating action is informing the driver of the vehicle if there is a runaway truck ramp near the location of the vehicle by an audio signal emitted from a speaker.

14. The non-transitory computer readable storage medium of claim 8, wherein the mitigating action of: receiving destination information input to an input device coupled to a processor, determining an alternative route to a destination using the global positioning system, and providing alternative route information to an output device coupled to the processor, occurs after informing the driver of the vehicle that utilizing a runaway truck ramp is not an option.

15. A system for assisting the braking system of a vehicle, the system comprising:
   a processor;
   a global position system receiver in communication with the processor;
   an antenna for receiving global positioning system signals, the antenna being in communication the global position system receiver;
   the processor being configured to determine the braking efficiency of the vehicle, collecting global positioning system information from the global position system receiver, determine a distance to an end of a grade of a road the vehicle is traveling based on the global positioning system information, determine if there is a possibility of failure of the braking system of the vehicle based on the braking efficiency of the vehicle and the distance to the end of the grade of the road the on which vehicle is traveling, and execute a mitigating action to prevent braking failure, the mitigation action comprising:
   receiving destination information that is input to an input device coupled to a processor;
   determining an alternative route to a destination using the global positioning system;
   providing alternative route information to an output device coupled to the processor, the alternative route information identifying an alternative route to the destination, which can mitigate vehicle brake failure.

16. The system of claim 15, further comprising: a brake temperature sensor in communication with the processor, whereby the brake temperature sensor determines the temperature of at least one brake of the vehicle; and wherein the processor is configured to determine the braking efficiency of the vehicle based on the brake temperature of the at least one brake of the vehicle.

17. The system of claim 16, further comprising: a wheel speed sensor in communication with the processor, whereby the wheel speed sensor determines the wheel speed of at least one wheel of the vehicle; and wherein the processor is configured to determine the braking efficiency of the vehicle based on the wheel speed of the at least one brake of the vehicle.

18. The system of claim 17, further comprising; a grade angle sensor in communication with the processor, whereby the grade angle sensor determines the grade angle of the vehicle; and wherein the processor is configured to determine the braking efficiency of the vehicle based on the grade angle of the vehicle.

19. The system of claim 15, wherein the mitigating action is downshifting a gear of the vehicle.

20. The system of claim 15, wherein the mitigating action is informing the driver of the vehicle if there is a runaway truck ramp near the location of the vehicle.

21. The system of claim 15, wherein the mitigating action of: receiving destination information input to an input device coupled to a processor, determining an alternative route to a destination using the global positioning system, and providing alternative route information to an output device coupled to the processor, occurs after informing the driver of the vehicle that utilizing a runaway truck ramp is not an option.

22. A system for assisting the braking system of a vehicle, the system comprising:

a processor;

a global position system receiver in communication with the processor;

a brake temperature sensor coupled to a vehicle brake and in communication with the processor, whereby the brake temperature sensor determines the temperature of at least one brake of the vehicle;

a wheel speed sensor in communication with the processor, whereby the wheel speed sensor determines the wheel speed of at least one wheel of the vehicle;

a grade angle sensor in communication with the processor, whereby the grade angle sensor determines the grade angle of the vehicle;

an antenna for receiving global positioning system signals, the antenna being in communication the global position system receiver;

the processor being configured to measure the braking efficiency of the vehicle, collecting global positioning system information from the global position system receiver, determine a distance to an end of a grade of a road the vehicle is traveling based on the global positioning system information, determine if there is a possibility of failure of the braking system of the vehicle based on the braking efficiency of the vehicle and the distance to the end of the grade of the road on which the vehicle is traveling, and execute a mitigating action to prevent braking failure;

wherein the braking efficiency of the vehicle is based on the brake temperature of the at least one brake of the vehicle, the wheel speed of the at least one brake of the vehicle, and the grade angle of the vehicle; and wherein the mitigating action comprises: receiving destination information input to an input device coupled to a processor, determining an alternative route to a destination using the global positioning system, and providing alternative route information to an output device coupled to the processor, after informing the driver of the vehicle that utilizing a runaway truck ramp is not an option.

* * * * *